United States Patent
Melfi et al.

(10) Patent No.: US 6,235,192 B1
(45) Date of Patent: May 22, 2001

(54) BIFLOW DRIER WITH IMPROVED FILTRATION

(75) Inventors: James J. Melfi, Elbridge; Gary E. Griffin, Penn Yan, both of NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 08/942,558

(22) Filed: Oct. 1, 1997

Related U.S. Application Data

(60) Provisional application No. 60/039,846, filed on Mar. 20, 1997.

(51) Int. Cl.$^7$ .................................................. B01D 27/14
(52) U.S. Cl. .................... 210/136; 210/117; 210/287; 210/446; 137/856; 96/134; 96/154
(58) Field of Search ........................ 137/512.4, 856, 137/854, 855; 210/117, 136, 282, 287, 437, 446, 266; 96/152, 134, 135, 154

(56) References Cited

U.S. PATENT DOCUMENTS

| | | |
|---|---|---|
| 1,416,771 | 5/1922 | Babson et al. . |
| 1,679,012 | 7/1928 | Wilson . |
| 2,019,747 | 11/1935 | Taylor . |
| 2,065,062 | 12/1936 | Dugelay . |
| 3,064,819 | 11/1962 | Jones . |
| 3,090,490 | 5/1963 | Yocum . |
| 3,178,022 | 4/1965 | Balogh . |
| 3,190,445 | 6/1965 | Rosaen . |
| 3,200,838 | 8/1965 | Sheaffer . |
| 3,286,728 | 11/1966 | Stephenson . |
| 3,434,599 | * 3/1969 | Wischmeyer et al. . |
| 3,680,707 | * 8/1972 | Zeek . |
| 3,841,490 | * 10/1974 | Hoffman et al. . |
| 4,029,580 | 6/1977 | Lange . |
| 4,082,295 | 4/1978 | Bainard . |
| 4,104,044 | 8/1978 | Lange . |
| 4,125,469 | 11/1978 | Henton et al. . |
| 4,177,145 | 12/1979 | Schumacher . |
| 4,192,751 | 3/1980 | Henton et al. . |
| 4,227,901 | 10/1980 | Lange . |
| 4,257,458 | 3/1981 | Kondo et al. . |
| 4,318,809 | 3/1982 | Bethel . |
| 4,320,000 | 3/1982 | Lange et al. . |
| 4,364,756 | 12/1982 | Clarke et al. . |
| 4,436,623 | * 3/1984 | Cullen et al. . |
| 4,437,490 | 3/1984 | Demers et al. . |
| 4,573,888 | 3/1986 | Kitchin . |
| 4,637,881 | 1/1987 | Sciuto . |
| 4,708,606 | 11/1987 | Zambelli . |
| 4,882,061 | 11/1989 | Petrucci et al. . |
| 4,954,252 | 9/1990 | Griffin et al. . |
| 4,995,452 | 2/1991 | Franck et al. . |
| 5,201,195 | 4/1993 | Gavlak et al. . |
| 5,364,540 | 11/1994 | Sciuto . |
| 5,440,899 | 8/1995 | Starr . |
| 6,152,996 | * 11/2000 | Linnersten et al. . |

FOREIGN PATENT DOCUMENTS 55-10287   12/1975   (JP) .

* cited by examiner

Primary Examiner—Joseph W. Drodge
Assistant Examiner—Terry K. Cecil
(74) Attorney, Agent, or Firm—Christopher H. Hunter

(57) ABSTRACT

A bi-directional filter has a pair of flapper-type check valve assemblies 20, 21 for directing fluid flow unidirectionally through a centrally supported molded desiccant core 22. Each check valve assembly is a three part structure spot-welded into a unitary assembly having a centering support plate, a core support cup and an intermediate flapper valve plate. A depth-type filter media circumferentially surrounds the desiccant core and extends between the check valve assembly on either end of the core for providing filtering for the fluid prior to entering the molded desiccant core. A depth-type filter media 80, 81 is also provided at each axial end of the core for providing fine filtration of the fluid after the fluid has passed through the core. The outer filter media is arranged to allow a portion of fluid therein to bypass the desiccant core.

25 Claims, 5 Drawing Sheets

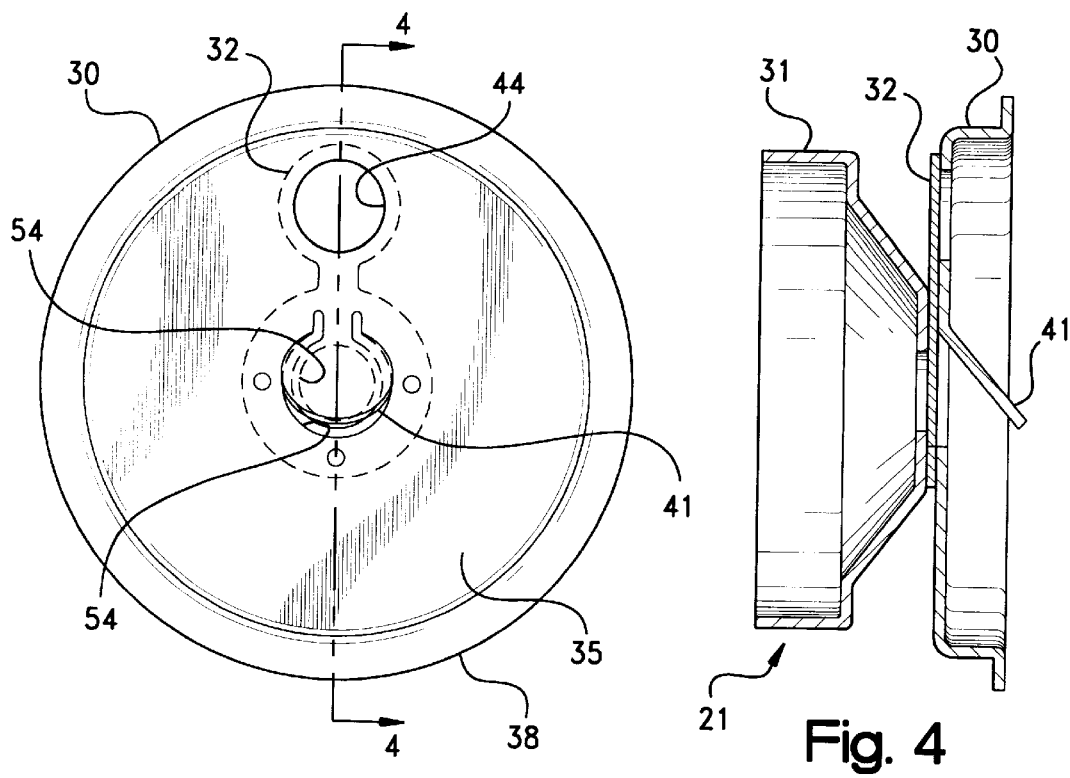
Fig. 3
Fig. 4
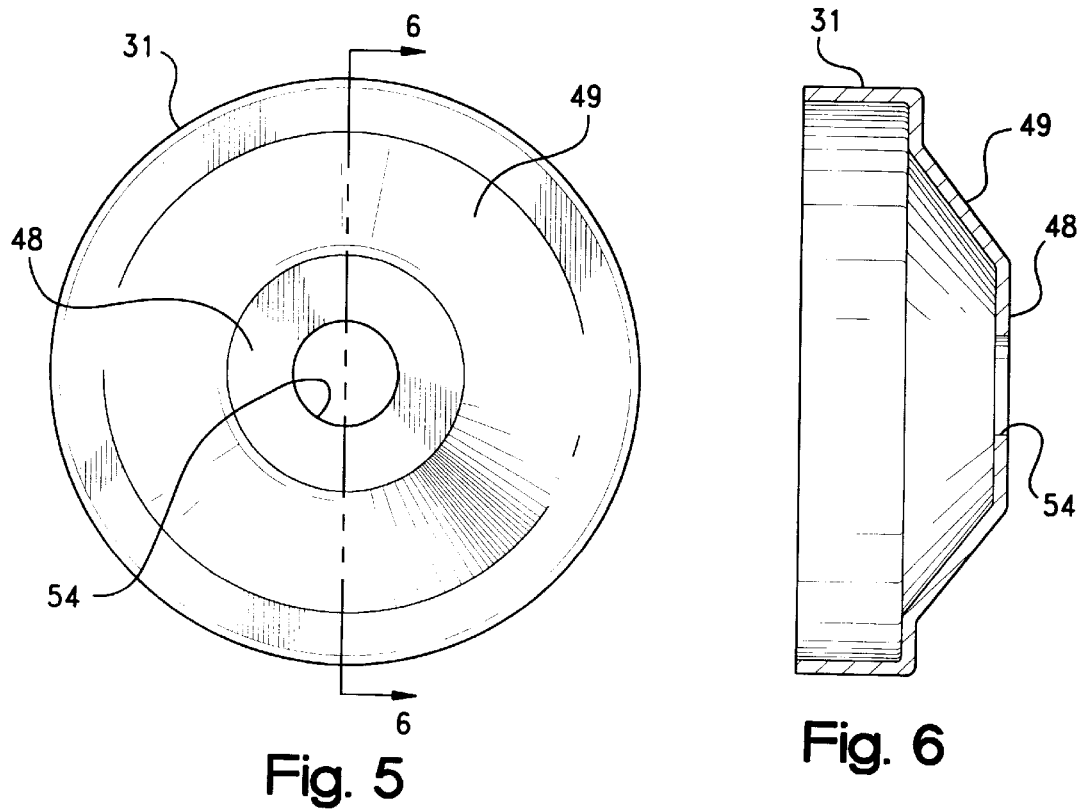
Fig. 5
Fig. 6

BIFLOW DRIER WITH IMPROVED FILTRATION

This application claims the benefit of U.S. Provisional Application No. 60/039,846 filing date Mar. 20, 1997.

BACKGROUND OF THE INVENTION

This invention relates to filter driers and more particularly to a bidirectional flow filter drier which is especially useful in heat pump systems or any other air conditioning or refrigerant systems where fluid flows may be reversed.

Bidirectional flow filter drier assemblies are well-known in these fields and provide convenient, economical devices which utilize a common filter drier medium and a minimum of interconnections with the plumbing of the system which is advantageous both from the standpoints of minimal original equipment and ease of maintenance and repair.

One particularly useful biflow drier is shown in Griffin, U.S. Pat. No. 4,954,252, which is owned by the assignee of the present invention. In the Griffin drier, a simplified and reliable biflow filter drier structure is provided which utilizes a minimal number of components. A valving structure in the filter drier is easily fabricated from punched metal parts and readily assembled by spot welding techniques. The valving structure includes a pair of identical check valve assemblies and a single molded desiccant core. The check valve assemblies are located at opposite ends of the core and each includes stainless steel reed-type flapper valves formed from a single sheet of material. While the Griffin drier structure is appropriate for many applications, the desiccant core provides both filtration and water removal functions, which can reduce the operational life of the desiccant. The desiccant in the core has small openings which can plug or clog, particularly on the surface of the core, and which may require frequent drier replacement.

As such, it is believed that there is a demand for a further improved bidirectional flow filter drier which has a structure where the desiccant core is not required to provide a filtration function, but which rather performs primarily a water-removing function and which thereby extends the useful life of the filter drier.

SUMMARY OF THE INVENTION

A new and unique bidirectional flow filter drier is provided where a depth-type filter media layer surrounds the desiccant core in the housing of the drier. The filter media layer extends against and along the outer surface of the desiccant core, preferably in one or more rings extending circumferentially around the core. The outer filter preferably has a greater filtration efficiency than the desiccant core to remove particles before the particles enter the core. The depth type of media for the outer filter captures the particles throughout substantially the entire thickness of the media, which extends the operational life of the desiccant material.

An additional filter media layer can be provided at both ends of the desiccant core. The end filters are disc-shaped and are disposed between the end surface of the core and the valve assembly associated with the end surface. The end filters separate fine particles from the fluid exiting axially from the core (depending upon the direction of fluid flow) and prevent the particles from being returned to the fluid system. A portion of the fluid passing through the drier can also pass directly from the outer filter to the end filters and bypass the desiccant core.

The filter drier includes a tubular housing, a pair of end caps with flow port fittings at either end of the housing, and a pair of identical check valve assemblies supporting opposite ends of the desiccant core. Each check valve assembly is preferably a spot-welded structure of a centering plate, a core support cup, and an intermediate flapper valve plate. The valve plate includes a pair of flapper reeds extending in opposite directions from a central support surface and normally covering a central valve opening in the core support cup, and at least one offset opening in the centering plate. The valves plates are moved to open positions by fluid pressure and are prevented from overtravel and overstressing by stop surfaces on both the core support cup and the centering plate. The flapper valve plates are formed from a single thin sheet of metal, preferably stainless steel.

A screen is provided against the outer end surface of each of the end filters to support the end filters. Perforated plates can also be provided against each of the inner and outer end surfaces of the end filters to support the end filters. The perforated plates on the inner end surface of the end filters also support the ends of the desiccant core and the ends of the outer filter. The brass screen and perforated plates are disposed within and supported by the core support cup in the check valve assemblies.

Further features of the present invention will become apparent to those skilled in the art upon reviewing the following specification and attached drawings.

BRIEF DESCRIPTION OF THE DRAWINGS

FIG. 3 is an end view of one of the flapper valve assemblies;

FIG. 4 is a sectional view of the flapper valve assembly of FIG. 3, taken along the lines 4—4;

FIG. 5 is an end view of the core support cup forming one part of the flapper valve assembly;

FIG. 6 is a sectional view of the core support cup of FIG. 5, taken along the lines 6—6;

DESCRIPTION OF THE PREFERRED EMBODIMENT

Figure 1:
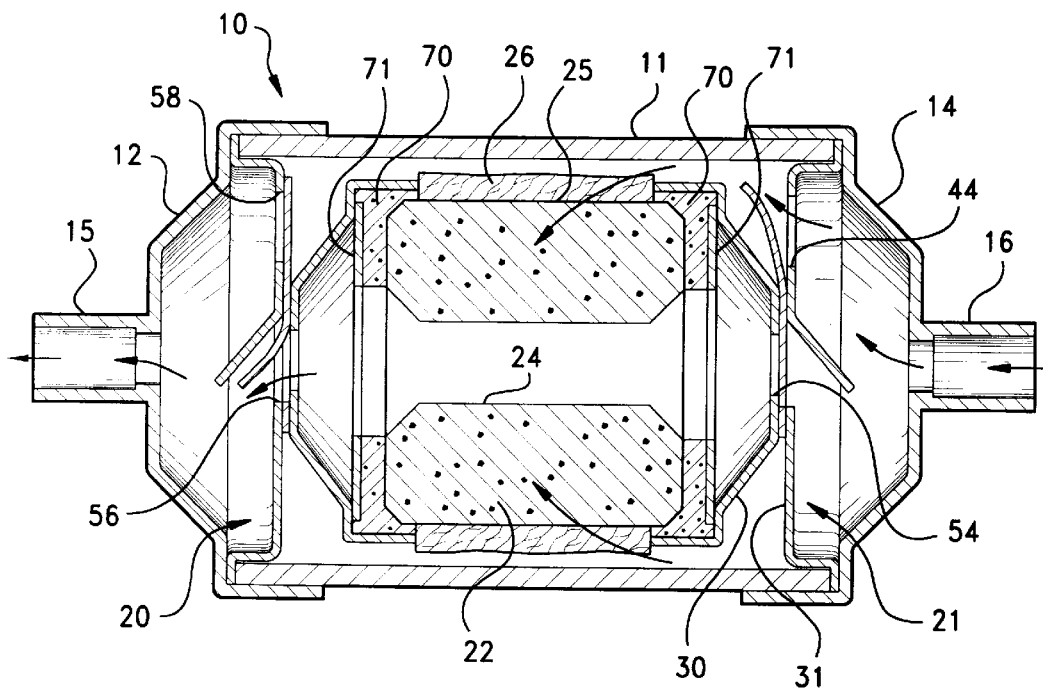
FIG. 1 is a sectional view of the filter drier of the invention showing the valves therein in a reverse flow condition.
Figure 2:
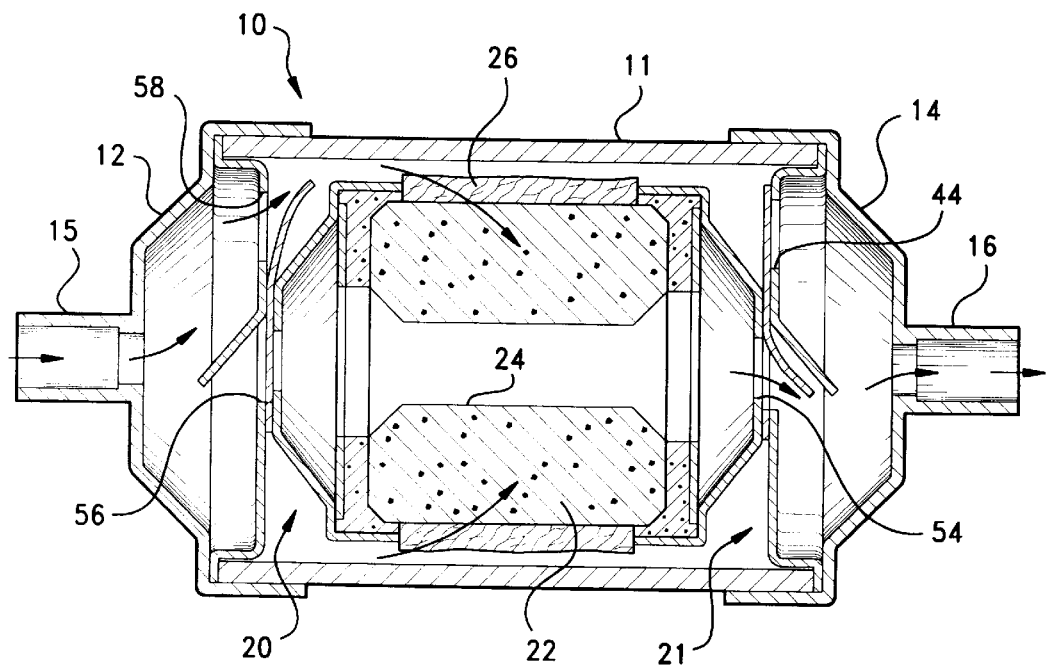
FIG. 2 is a sectional view of the filter drier of the invention showing the valves therein in a forward flow condition.

Referring now to FIGS. 1 and 2 there is shown a first embodiment of the filter drier 10 of the invention in the operating modes of reverse fluid flow in FIG. 1 and forward fluid flow as depicted in FIG. 2, for a conventional heat pump system or the like. The filter drier 10 comprises a tubular casing 11 having first and second ends at which end caps 12, 14 are positioned. End caps 12, 14 are closure members for tubular casing 11 and each respectively includes a fluid flow port 15, 16. In this embodiment of the invention, the fluid flow ports 15, 16 are depicted as short tubular stubs centrally positioned in end caps 12, 14 and located substantially on the central axis of casing 11. End cap 12, 14 and flow ports 15, 16 may comprise separate structures but typically are brazed or welded to one another and to casing 11 to form an integral housing structure. Flow ports 15, 16 may be joined to interconnecting conduits of a typical heat pump system by a soldered connection or by another convenient joining technique.

Located within casing 11 are first and second valve assemblies 20, 21 and porous molded desiccant core 22 which is supported between valve assemblies 20, 21. Molded desiccant core 22 is a rigid, but porous cylindrical structure having a central longitudinal bore 24 therein with slightly outwardly flared ends, although the desiccant core 22 could also be a solid structure without such a bore to maximize the quantity of desiccant material available (see, e.g., FIG. 10). In any case, the desiccant core is is preferably formed of activated alumina and molecular sieve with a phosphate bond or an organic bond (such as a polyphenylene sulfide), although many other materials would be suitable. Core 22 includes an outer peripheral cylindrical surface 25 and is adapted in this embodiment of the invention for unidirectional fluid flow through core 22 from outer surface 25 to central bore 24.

An outer porous filter media layer 26 surrounds desiccant core 22. Outer filter 26 is preferably a depth type of media, such as a non-compressed layer of fiberglass or polyester, and is preferably formed in a ring, donut or annulus, the inner surface of which is located in contact with the outer surface of the desiccant core. Outer filter 26 can be a single ring, or a series of rings in adjacent abutting contact along the desiccant core. The ring(s) extend along at least a portion of the desiccant core between the two valve assemblies 20, 21, and are supported and retained therebetween. The thickness of this outer filter media layer is on the order of 0.4 inches for a desiccant core having a radial diameter on the order of 1.5 inches, but can vary and depends upon the space between the inside surface of casing 11 and desiccant core 22, the efficiency and required life of the media, and the cost of the media. Generally, the thicker the media layer the longer the useful life of the desiccant material. However, the media layer should not be so thick as to block or substantially restrict fluid flowing around the periphery of the desiccant core.

Outer filter 26 is chosen so as to filter out substantially all particulate matter passing radially inward through the desiccant core 22 which would normally clog the pores in the desiccant core and reduce the effectiveness of the desiccant media. The outer filter 26 should therefore provide at least the same and preferably slightly finer filtration (be slightly more efficient) than the desiccant material. By using an outer filter, a larger pore size can be used with the desiccant core, which allows less expensive desiccant material (such as molecular sieve) can be used, thereby reducing the cost of the desiccant core and the overall cost of the filter drier; and increase the flow through the drier, which increases the efficiency of the system. It is believed that the depth type of media for the outer filter 26 allows for increased contaminant removal as compared to a surface-type of media, as a depth-type of media generally collects particles throughout substantially its entire depth while a surface type of media, as the name suggests, only collects particles on its outer surface. However, although not preferred, a surface-type of media could also be used to obtain some of the benefits of the present invention.

Figure 9:
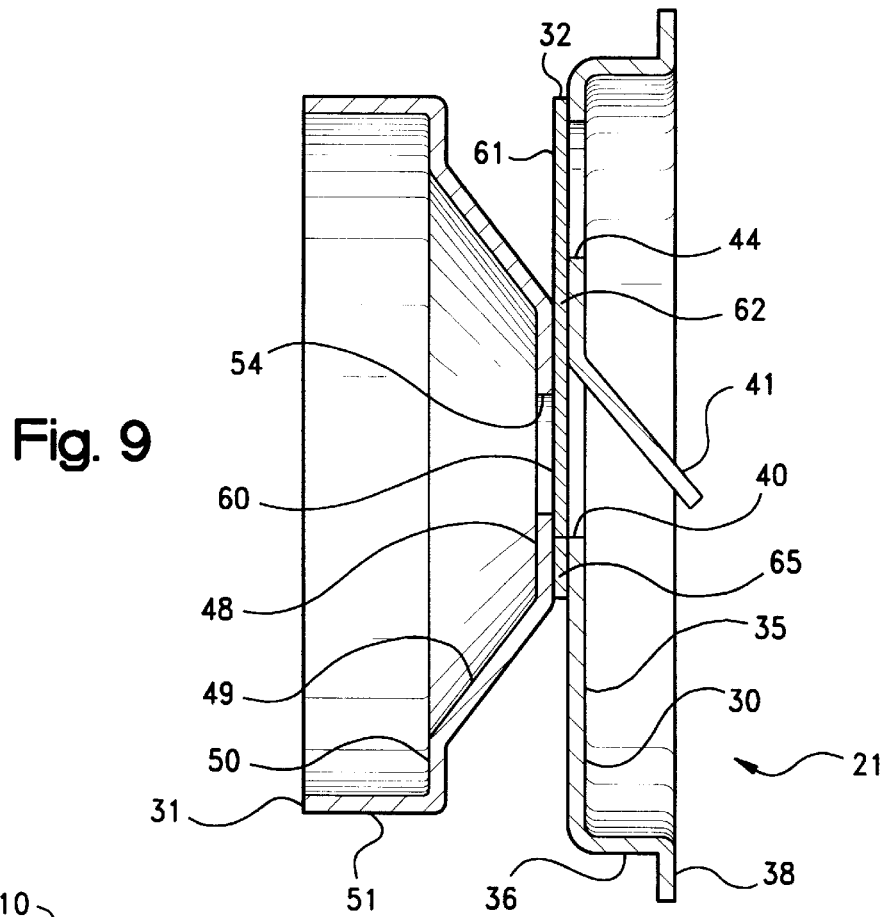
FIG. 9 is an enlarged sectional view of the flapper valve assembly shown in FIG. 4.

Each valve assembly 20, 21 is identical but positioned reversely in casing 11 to direct fluid flow in the manner depicted by arrows in FIGS. 1 and 2. Only valve assembly 21 will be described in detail and it will be understood that valve assembly 20 comprises an identical construction. Referring more particularly to the enlarged view of FIG. 9 it will be seen that valve assembly 21 comprises only three components consisting of centering support plate 30, core support cup 31 and flapper valve plate 32. In the view of FIG. 9 valve assembly 21 is shown in the assembled, normally closed condition, while in FIGS. 1 and 2, valve assemblies 20, 21 are shown as subject to fluid flow.

With reference also to FIGS. 3 and 4, centering support plate 30 consists of a circular disk shaped member having a flat bottom wall 35, cylindrical peripheral side wall 36 and outwardly directed annular flange 38. Support plate 30 is formed as a simple stamping, typically of steel and may be formed of sheet material on the order of 0.024 inch thickness, and having an overall diameter on the order of 2.5 or 3.0 inches. Support plate 30 further includes a generally circular central opening 40 which is formed by punching and partially severing a flap 41 of material which is left angled with respect to the plane of bottom wall 35 at an angle of approximately twenty-five degrees. As will be described in greater detail hereafter, flap 41 serves as an overtravel stop for one of the check valves of valve assembly 21. A further offset passage 44 is provided in bottom wall 35 of support plate 30, being positioned about midway between central opening 40 and side wall 36. The periphery of offset passage 44 is the valve seat for one of the check valves of valve assembly 21. The passage 44 may be a single circular opening, a slotted opening, or a plurality of openings.

With reference as well to FIGS. 5 and 6, core support cup 31 is a circular cup-shaped member having a central flat bottom wall 48, conical intermediate wall 49, flat annular shelf 50 and cylindrical outer wall 51. Support cup 31 further includes a central circular opening 54 in bottom wall 48, the periphery of which is a valve seat for one of the check valves of valve assembly 21. Conical wall 49 is angled relative to bottom wall 48 at an angle of about twenty-eight degrees and serves as the overtravel stop for one of the check valves of valve assembly 21. Core support cup 31 is also formed of thin steel sheet on the order of 0.024 inch thickness.

Figure 7:
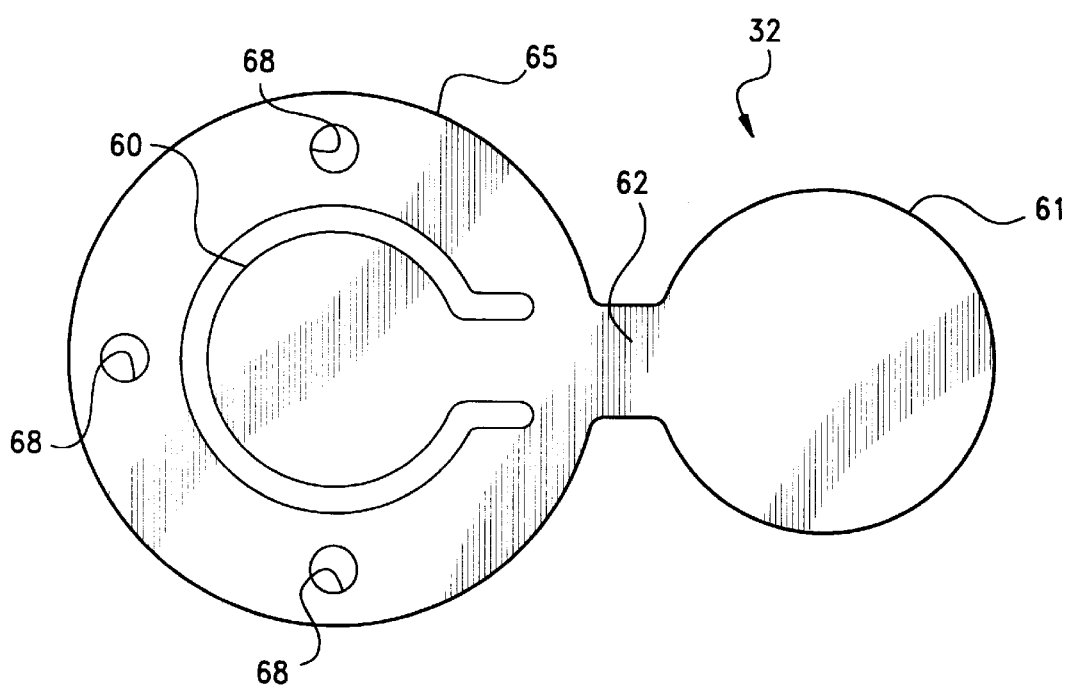
FIG. 7 is a plan view of the flapper valve portion of the flapper valve assembly.

Valve assembly 21 is completed by flapper valve plate 32 which also is a thin plate and which is sandwiched between support plate 30 and support cup 31. With reference also to FIG. 7, flapper valve plate 32 is preferably a stainless steel, sheet metal stamping, on the order of 0.003 inch thickness and consists essentially of first flapper valve 60, second flapper valve 61, and intermediate support section 62. Flapper valves 60, 61 extend in opposite directions from central support section 62 in the form of reed valves and in this embodiment of the invention have generally circular distal ends sized to adequately cover the associated valve seat openings, although the configuration of the flapper valves can very depending upon the configuration of the corresponding valve seat opening. As best seen in FIG. 9, first flapper valve 60 is disposed adjacent opening 54 of support cup 31, and second flapper valve 61 is disposed adjacent offset opening 44 of support plate 30. Flapper plate 32 further comprises annular support section 65 which is an extension of intermediate support section 62 and which surrounds first flapper valve 60. Annular support section 65 includes three holes 68 spaced at ninety degree intervals, which receive weld projections for securing support plate 30 and support cup 31 by spot welds. Flapper valve plate 32 court be formed of other materials as well, such as Teflon® or the like, and the entire assembly joined by staking rather than spot welds, which would avoid heat distortion effects.

With support section 62 and annular support section 65 in firm engagement therebetween, support plate 30 and the bottom wall 48 of support cup 31 are positioned in substantially parallel, close engagement with flapper valves 60, 61 covering the respective valve seat openings 54, 44, thereby forming a pair of check valves. Since the material of flapper valve plate 32 is thin and flexible, flapper valves 60, 61 are able to flex away from their respective valve seat openings 54, 44 under the urging of fluid flow to allow flow in one direction, but to prevent flow in the opposite direction when the valves are urged against their respective valve seats. Flapper valve 60 may be moved to an open position away from opening 54 but is limited from over-flexing by overtravel stop 41. Similarly, flapper valve 61 may be moved to an open position away from opening 44 but is limited from overflexing by conical wall 49 of support cup 31, both conditions being depicted in FIGS. 1 and 2. In this embodiment of the invention, central valve seat opening 54 is on the order of 0.5 or 0.6 inch diameter, while offset valve seat opening 44 is on the order of 0.375 or 0.5 inch diameter.

Figure 8:
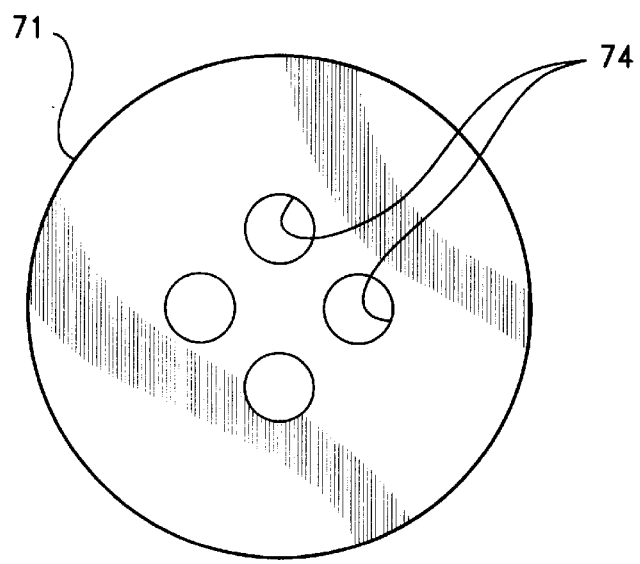
FIG. 8 is a plan view of a perforated plate supported at either end of the desiccant core.

The valve assemblies 20, 21 thus comprise rigid support members, each with a pair of check valves therein and are supported in casing 11 by the placement of flanges 38 between the ends of casing 11 and respective end caps 12, 14 and permanently securing the structure by brazing end caps 12, 14 to casing 11. Supported in the facing support cups 31 of the valve assemblies 20, 21 is molded desiccant core 22 which includes at either end an annular ceramic gasket 70 and circular perforated plate 71. Perforated plate 71 is seen in plan view in FIG. 8 as comprising a disk having a plurality of apertures 74 at the center thereof and which together with gasket 70 prevents flow of fluid through the ends of core 22, and allows flow through center bore 24.

Thus, with reference to FIG. 1 it may be seen that under reverse flow conditions, that is, where fluid pressure is higher at port 16 than at port 15, flow would occur as depicted by the arrows through the offset valve seat 44 of valve assembly 21 and around the periphery of the desiccant core 22, radially-inward through outer filter 26, radially-inward through desiccant core 22, and axially outward through central bore 24 to the center valve seat 56 of valve assembly 20 and port 15. Under these conditions, the center valve seat 54 of valve assembly 21 and the offset valve seat 58 of valve assembly 20 would be in the normally closed condition and would be further urged to the closed condition by the fluid flow. The outer filter media layer 26 removes harmful particles, which allows desiccant core 22 to function primarily as a water-removing device, rather than also as a filtering device.

In the forward flow direction as seen by the arrows in FIG. 2, flow enters port 15, then passes through the offset valve seat 58 of valve assembly 20, around the periphery of the desiccant core 22, radially-inward through outer filter 26, radially-inward through the desiccant core 22, and axially outward through central bore 24 to the center valve seat 54 of valve assembly 21 and port 16. Under these conditions, the center valve seat 56 of valve assembly 20 and the offset valve seat 44 of valve assembly 21 would be closed and firmly urged to the closed position by the fluid flow. Again, outer filter media layer 26 filters the fluid before the fluid enters the desiccant core. In both the forward and reverse flow situations, fluid flows through desiccant core 22 so that the desiccant material may remove water in both directions.

In a further embodiment of the invention as illustrated in FIGS. 10–13, the filter drier 10 can include a porous filter media layer 80, 81 at either axial end of desiccant core 22. In this embodiment, each end filter 80,81 comprises a disc-shaped media layer for fine filtration of fluid passing out of the desiccant core. The media is preferably a depth-type of media, such as a non-compressed layer of fiberglass or polyester, which collects particles from fluid flowing through the media through substantially its entire depth. The end filters 80, 81 have at least the same filtration efficiency and preferably have a finer filtration than the desiccant core 22 and the outer filter 26, such that the outer filter 26 captures the larger particulate matter to prevent the matter from plugging the pores in the desiccant core, while the smaller particles pass through the outer filter and the desiccant core and are separated by the end filters 80, 81 (depending upon the direction of fluid flow).

Figure 10:
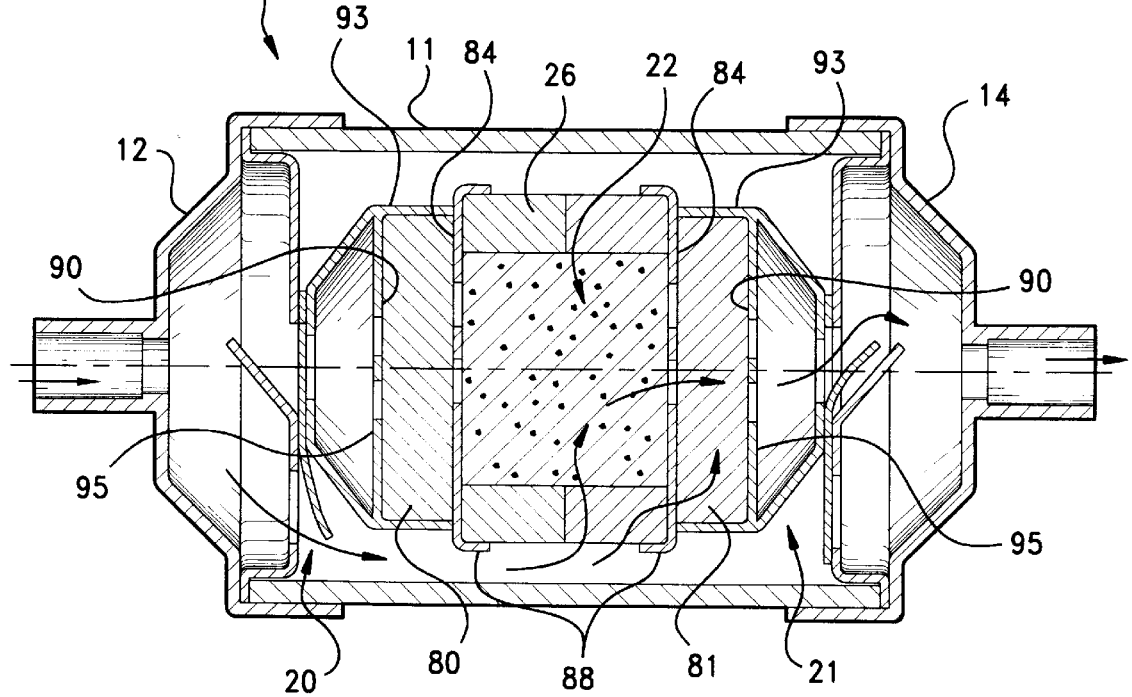
FIG. 10 is a sectional view of a filter drier constructed according to an additional embodiment of the present invention.

In FIG. 10, the filter drier is shown in a forward flow condition, and fluid passes radially inward through outer filter 26, radially inward through desiccant core 22, and then axially outward through end filter 81 to valve assembly 21 and port 16. For the reverse flow condition, the fluid passes axially outward from core 22 through end filter 80 to valve assembly 20 and port 15.

In this further embodiment, a circular perforated metal plate 84 (FIG. 11) can be located between and against one end surface of desiccant core 22 and the inner (upstream) end surface of end filter 80, and between and against the other end surface of desiccant core 22 and the inner (upstream) end surface of end filter 81. Perforated plate 84 has a similar structure as the perforated plate 71 described above with respect to FIGS. 1–9, however, the plate includes apertures 85 formed across the entire plate for directing fluid flowing axially outward from the desiccant core 22. Plate 84 is also disposed against and supports an end surface of outer filter 26, and allows a portion of the fluid to bypass desiccant core 22 and flow directly to end filters 80, 81 particularly through the perforations which are located between the end surfaces of outer filter 26 and the peripheral portion of the inner end surface of end filters 80, 81. Because the filter drier operates in a closed system, the fluid which flows directly to the end filters and bypasses the desiccant core is likely to pass through the desiccant core in subsequent passes through the filter drier. Additionally, in this case, the portion of the fluid that passes through the desiccant core will travel more slowly than the fluid bypassing the core. The additional contact time enhances moisture removal in the core. Thus the total moisture removal capability of the assembly is essentially unaffected by the partial bypass flow path.

Figure 12:
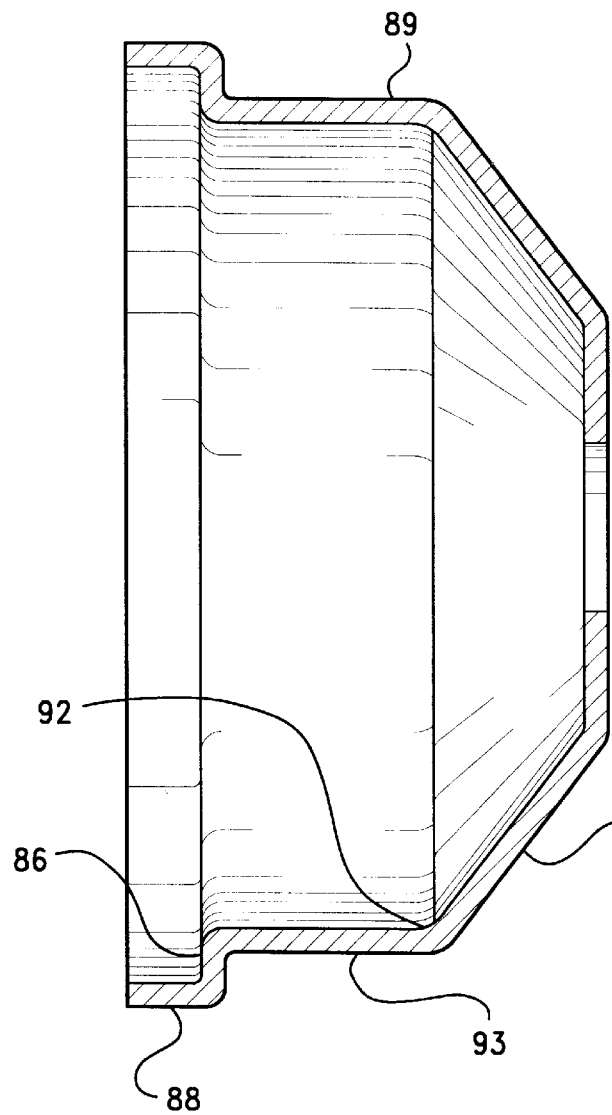
FIG. 12 is a sectional view of the core support cup forming one part of the flapper valve assembly for the filter drier of FIG. 10.
Figure 11:
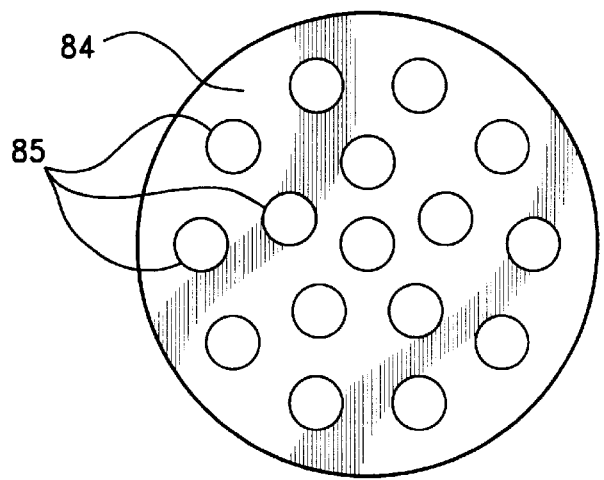
FIG. 11 is a plan view of one of the perforated plates supported at one end surface of the end filters for the filter drier of FIG. 10.
Figure 13:
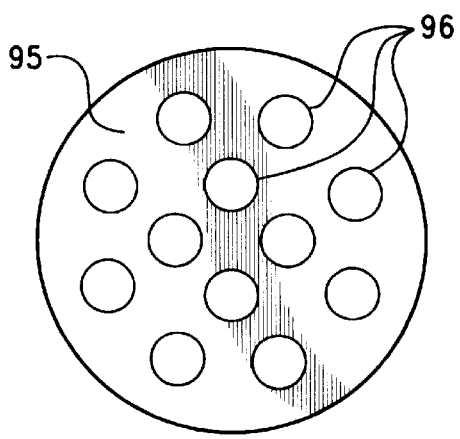
FIG. 13 is a plan view of another of the perforated plates supported at another end surface of the end filters for the filter drier of FIG. 10.

Perforated plate 84 is supported within core support cup 89 against a radially-extending annular shoulder 86 formed by outer cup-shaped portion 88 (FIG. 12). Cup-shaped portion 88 also receives and retains a portion of the length of outer filter 26, along both ends of the filter.

A circular brass screen 90 is located between and against the outer (downstream) end surface of the end filter 80 and valve assembly 20, and between and against the outer (downstream) end surface of end filter 81 and valve assembly 21. Each screen 90 is received and supported by a shoulder 92 formed between the outer cylindrical wall 93 and the conical wall 94 of the core support cup 89 in each valve assembly. Each end filter 80, 81 is likewise retained and supported within the outer cylindrical wall 93 between the screen 90 and the perforated plate 84, and fills the entire length of this wall. Preferably a further circular perforated metal plate 95 (FIG. 13) is located against the outer (downstream) surface of each screen 90 to provide additional support for the outer end surface of end filters 80, 81. Perforated plate 95 can be similar to perforated plate 84, that is, with openings 96 across the entire plate, and is located between the screen 90 and shoulder 92 within core support cup 89.

All other aspects of the valve assemblies 20, 21 and of the outer casing 11 and end caps 12, 14 for the filter drier can be the same in this embodiment as in the first embodiment above with respect to FIGS. 1–9.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A bidirectional filter drier, comprising:
   a casing having opposed ends;
   end caps at said opposed ends,
   a flow port in each of said end caps,
   first and second check valve assemblies supported in said casing at said opposed ends, and
   a molded desiccant core centrally supported by said valve assemblies, each of said check valve assemblies including a first valve to allow fluid to flow from a respective flow port in an adjacent end cap around the periphery of the desiccant core and radially inward toward the center of the core, and a second valve to allow fluid to flow axially outward from the center of the desiccant core to the flow port in the adjacent end cap, and
   an outer filter media layer surrounding said desiccant core and extending between said valve assemblies to separate particles in the fluid passing radially inward through the desiccant core, said outer filter media arranged to allow a portion of fluid passing therein to bypass the desiccant core, said outer filter layer having a filtration efficiency at least as great as the desiccant core.

2. The filter drier as in claim 1, wherein the desiccant core is a cylindrical structure and the outer filter is a ring of material entirely circumferentially surrounding and in surface-to-surface contact with the desiccant core.

3. The filter drier as in claim 2, wherein the outer filter is a polyester or fiberglass media.

4. The filter drier as in claim 1, further including a filter media layer at each axial end of the desiccant core between said core and said check valve assemblies to separate particles in the fluid passing axially outward from the center of the desiccant core, said end filters having a filtration efficiency at least as great as the desiccant core.

5. The filter drier as in claim 4, wherein the end filters are each depth filter media which collect particles throughout substantially the entire depth of the axial media layer.

6. The filter drier as in claim 4, wherein the end filters are each disc-shaped and have an inner surface disposed adjacent a respective outer end surface of the desiccant core.

7. The filter drier as in claim 6, wherein the inner surface of the end filters is also disposed adjacent a respective end surface of the outer filter to separate particles in the fluid passing from the outer filter directly to the end filters and bypassing the desiccant core.

8. The filter drier as in claim 4, further including a perforated plate disposed against at least one end surface of each of the end filters.

9. The filter drier as in claim 8, wherein each perforated plate is also disposed against a respective end surface of the outer filter, the perforations in the plates being located at a location between the outer filter and the end filters to allow fluid to flow from the outer filter directly to the end filters and bypass the desiccant core.

10. The filter drier as in claim 4, further including a screen disposed against an outer end surface of each of the end filters.

11. The filter drier as in claim 10, further including a perforated plate disposed against each screen to support the screen.

12. The filter drier as in claim 4, wherein each end filter is a polyester or fiberglass media.

13. The filter drier as in claim 4, wherein each of said check valve assemblies includes a core support cup supporting opposed ends of the desiccant core and surrounding and supporting a respective end filter at each end of the desiccant core.

14. The filter drier as in claim 13, wherein each core support cup also surrounds and supports at least a portion of the length of the outer filter along each end of the outer filter.

15. The filter drier as in claim 1, wherein a flow path is provided between the casing and a radially outer surface of the filter media layer, said flow path allowing fluid to flow from one flow port, radially inward through the media to the desiccant core, and then to the other flow port.

16. The filter drier as in claim 15, wherein the outer filter media layer has a radially outer surface spaced-apart from the casing along the entire extent of the outer filter media layer.

17. The filter drier as in claim 1, wherein the outer filter media layer is a depth filter media which collects particles throughout substantially the entire thickness of the filter.

18. A bidirectional filter drier, comprising:
   a tubular casing having opposed ends;
   end caps at said opposed ends,
   a flow port in each of said end caps,
   first and second check valve assemblies supported in said casing at said opposed ends, and
   a cylindrical core of molded desiccant material centrally supported on each end by said valve assemblies, each of said check valve assemblies including a first valve to allow fluid to flow from a respective flow port in an adjacent end cap around the periphery of the desiccant core and radially inward toward the center of the core, and a second valve to allow fluid to flow axially outward from the center of the desiccant core to the flow port in the adjacent end cap,
   an outer depth type filter media layer in surface-to-surface contact with and circumferentially surrounding said desiccant core to separate particles in the fluid passing radially inward through the desiccant core, said outer filter media arranged to allow a portion of fluid passing therein to bypass the desiccant core, said outer filter layer having a filtration efficiency at least as great as the desiccant core,
   a disc-shaped depth-type filter media layer adjacent each end of said desiccant core between said core and said check valve assemblies to separate particles in the fluid passing axially outward from the center of the desiccant core, said end filters each having a filtration efficiency greater than the desiccant core, and a perforated plate disposed between each end of the desiccant core and each end filter, each perforated plate also supporting an end of the outer filter and allowing fluid to pass from the outer filter directly to the end filters and bypass the desiccant core.

19. The filter drier as in claim 18, wherein each of said check valve assemblies includes a core support cup supporting opposed ends of the desiccant core and surrounding and supporting a respective end filter at each end of the desiccant core.

20. The filter drier as in claim 19, wherein each core support cup also surrounds and supports at least a portion of the length of the outer filter along each end of the outer filter.

21. The filter drier as in claim 18, wherein a flow path is provided between the casing and a radially outer surface of the filter media layer, said flow path allowing fluid to flow from one flow port, radially inward through the media to the desiccant core, and then to the other flow port.

22. The filter drier as in claim 21, wherein the outer filter media layer has a radially outer surface spaced-apart from the casing along the entire extent of the outer filter media layer.

23. A bi-directional filter drier, comprising:

a casing having opposed ends;

end caps at said opposed ends, a flow port in each of said end caps, first and second check valve assemblies supported in said casing at said opposed ends, and a molded desiccant core centrally supported by said valve assemblies, each of said valve assemblies including a first valve to allow fluid to flow from between a respective flow port in an adjacent end cap and the radial periphery of the desiccant core, and a second valve to allow fluid to flow axially between the center of the desiccant core and the flow port in the other adjacent end cap, said fluid flowing radially through the desiccant core to remove water contaminants, and an outer filter media layer circumferentially surrounding said desiccant core and a flow path provided between a radially-outer surface of the filter media layer and the casing to allow fluid flow therebetween, said filter media layer extending between said valve assemblies to separate particles from the fluid passing radially through the filter media layer and the desiccant core, said outer filter media arranged to allow a portion of fluid passing therein to bypass the desiccant core.

24. The filter drier as in claim 23, wherein the radially-outer surface of the other filter media layer is spaced-apart from the casing along the entire extent of the outer filter media layer.

25. The filter drier as in claim 23, wherein the outer filter media layer is a depth filter media which collects particles throughout substantially the entire thickness of the filter.

* * * * *